(12) United States Patent  (10) Patent No.: US 8,711,877 B2
Suzuki  (45) Date of Patent: Apr. 29, 2014

(54) APPARATUS AND METHOD FOR CONNECTION CONTROL WITH MEDIA NEGOTIATION SUCCESSFUL ON DIFFERENT MEDIA FORMATS

(75) Inventor: Tomoyasu Suzuki, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 623 days.

(21) Appl. No.: 12/458,680

(22) Filed: Jul. 20, 2009

(65) Prior Publication Data

US 2010/0124217 A1  May 20, 2010

(30) Foreign Application Priority Data

Nov. 17, 2008 (JP) ................................ 2008-293588

(51) Int. Cl.
  *H04J 3/22* (2006.01)
(52) U.S. Cl.
  USPC ....................................................... 370/466
(58) Field of Classification Search
  None
  See application file for complete search history.

(56) References Cited

U.S. PATENT DOCUMENTS

| 5,848,134 | A * | 12/1998 | Sekiguchi et al. | 379/93.15 |
| 7,327,480 | B1 * | 2/2008 | Ida et al. | 358/1.15 |
| 2004/0015589 | A1 * | 1/2004 | Isozu | 709/227 |
| 2004/0095958 | A1 * | 5/2004 | Ejzak et al. | 370/465 |

FOREIGN PATENT DOCUMENTS

| JP | 2005-198181 A | 7/2005 |
| JP | 2006-005754 A | 1/2006 |

* cited by examiner

*Primary Examiner* — Yong Zhou
(74) *Attorney, Agent, or Firm* — Rabin & Berdo, P.C.

(57) ABSTRACT

In an apparatus for connection control between two terminals, a communication unit transmits or receives a connection control signal to or from the terminals. A storage stores media format information usable on the two terminals, which are to be supplied with the media format information on media formats converted by a media format converter. A media format information supplementing unit references the media format information storage, based on the connection control signal received from the terminal, and verifies a possible presence of common media format information usable by the terminals to be interconnected. If there is no common media format information, predetermined media format information is supplemented to the connection control signal, and a resulting connection control signal is delivered to the communication device. Thus, media negotiation may be made even when media formats usable on the two terminals differ from each other.

4 Claims, 8 Drawing Sheets

FIG. 3

| IP NETWORK | SUPPORTED CODING FORM | CODING FORM | CODING FORM-SPECIFIC CONVERSION SUPPLEMENTAL INFORMATION |
|---|---|---|---|
| 3A | PCMU, G.722 | PCMU | TIME SEGMENT, 20msec ; WITH IN-BAND DTMF |
| | | G.722 | BIT RATE, 64kbs ; TIME SEGMENT, 10msec ; WITH IN-BAND DTMF |
| 3B | PCMU, EVRC | PCMU | TIME SEGMENT, 10msec ; WITH IN-BAND DTMF |
| | | EVRC | BIT RATE, 64kbs ; EVRC PAYLOAD TYPE, HEADER-FREE PACKET FORMAT…. |
| ⋮ | | | |

| MEDIA CONVERTER-SUPPORTABLE CODING FORM LIST |
|---|
| PCMU |
| G.722 |
| G.726 |
| EVRC |
| ... |

| CODING FORMS | CODING FORM-SPECIFIC CONVERSION SUPPLEMENTAL INFORMATION |
|---|---|
| PCMU | TIME SEGMENT, 20msec ; WITH IN-BAND DTMF |
| G.722 | BIT RATE, 64kbs ; TIME SEGMENT, 10msec ; WITH IN-BAND DTMF |

FIG. 7

| CODING FORMS | CODING FORM-SPECIFIC CONVERSION SUPPLEMENTAL INFORMATION |
|---|---|
| PCMU | TIME SEGMENT, 10msec; WITH IN-BAND DTMF |
| EVRC | BIT RATE, 64kbs; EVRC PAYLOAD TYPE, HEADER-FREE, PACKET FORMAT... |

APPARATUS AND METHOD FOR CONNECTION CONTROL WITH MEDIA NEGOTIATION SUCCESSFUL ON DIFFERENT MEDIA FORMATS

BACKGROUND OF THE INVENTION

1. Field of the Invention

The present invention relates to an apparatus and a method for connection control in a telecommunications network system, and more particularly to such an apparatus and a method applicable to, for example, a SIP (Session Initiation Protocol) signal converter provided on the boundary between different IP (Internet Protocol) networks and adapted to convert SDPs (Session Description Protocols).

2. Description of the Background Art

Recently, attempts are made to provide various communications services, such as speech, video (still and moving pictures) data and those collaborative with each other. In order to assure interconnections between endpoints participating in such communications services, the SIP is utilized.

For example, Japanese Patent Laid-Open Publication Nos. 2005-198181 and 2006-5754 disclose solutions for a SIP signal converter, which is, specifically, cooperative with a NAT (Network Address Translation) system to translate IP addresses and port numbers in SDPs.

However, the conventional solutions suffer from the problem that, in the IP-based communications of, for example, speech or video, if media formats usable on opposite endpoints differ from each other, then media negotiation for media format conversion in terms of establishing an interconnection between the endpoints is not possible.

SUMMARY OF THE INVENTION

It is therefore an object of the invention to provide an apparatus and a method for connection control which allow media negotiation to proceed also in case media formats usable on opposite endpoints differ from each other.

In accordance with the present invention, a connection control apparatus configured for interconnecting a plurality of terminals comprises a communication circuit for transmitting or receiving a connection control signal between the terminals, a media format information storage and a media format information supplementing circuit. The media format information storage stores media format information usable on the terminals which are to be supplied with media format information on media formats already converted by a media format converter. The media format information supplementing circuit references the media format information storage, based on the connection control signal received from the terminals, and verifies a possible presence of the common media format information that may be used by the terminals which are being interconnected. The media format information supplementing circuit supplements predetermined media format information to the connection control signal if there is no common media format information, and delivers a resulting connection control signal to the communication circuit.

Also in accordance with the present invention, there is provided a method for connection control of a connection control apparatus configured for interconnecting a plurality of terminals. The connection control apparatus includes a media format information storage, a communication circuit, and a media format information supplementing circuit. The terminals are supplied with media format information on media formats already converted by a media format converter. The method comprises the steps of storing in the media format information storage media format information usable on the terminals, transmitting or receiving by the communication circuit a connection control signal to or from the terminals, and using the connection control signal received from the terminals to reference the media format information storage by the media format supplementing circuit to verify a possible presence of common media format information that may be used by the multiple terminals being interconnected, and supplementing predetermined media format information to the connection control signal if there is no common media format information, and delivering a resultant connection control signal to the communication circuit.

Further in accordance with the present invention, there is provided a connection control program for controlling a computer, wherein the computer includes a storage for storing media format information usable by a plurality of terminals which are to be supplied with media format information on media formats already converted by a media format converter. The program controls the computer to operate as a communication circuit for transmitting or receiving a connection control signal to or from the terminals, a media format information supplementing circuit operative in response to the connection control signal, received from the terminals, for referencing the media format information storage to verify a possible presence of common media format information that may be used by the terminals being interconnected, the media format information supplementing circuit supplementing, if there is no common media format information, predetermined media format information to the connection control signal and delivering a resulting connection control signal to the communication circuit.

Thus, in accordance with the present invention, media negotiation that allows an interconnection between two endpoints to be established may be made even if media formats usable by both endpoints differ from each other, so far as the media formats are supportable by a media format converter.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

Figure 1:
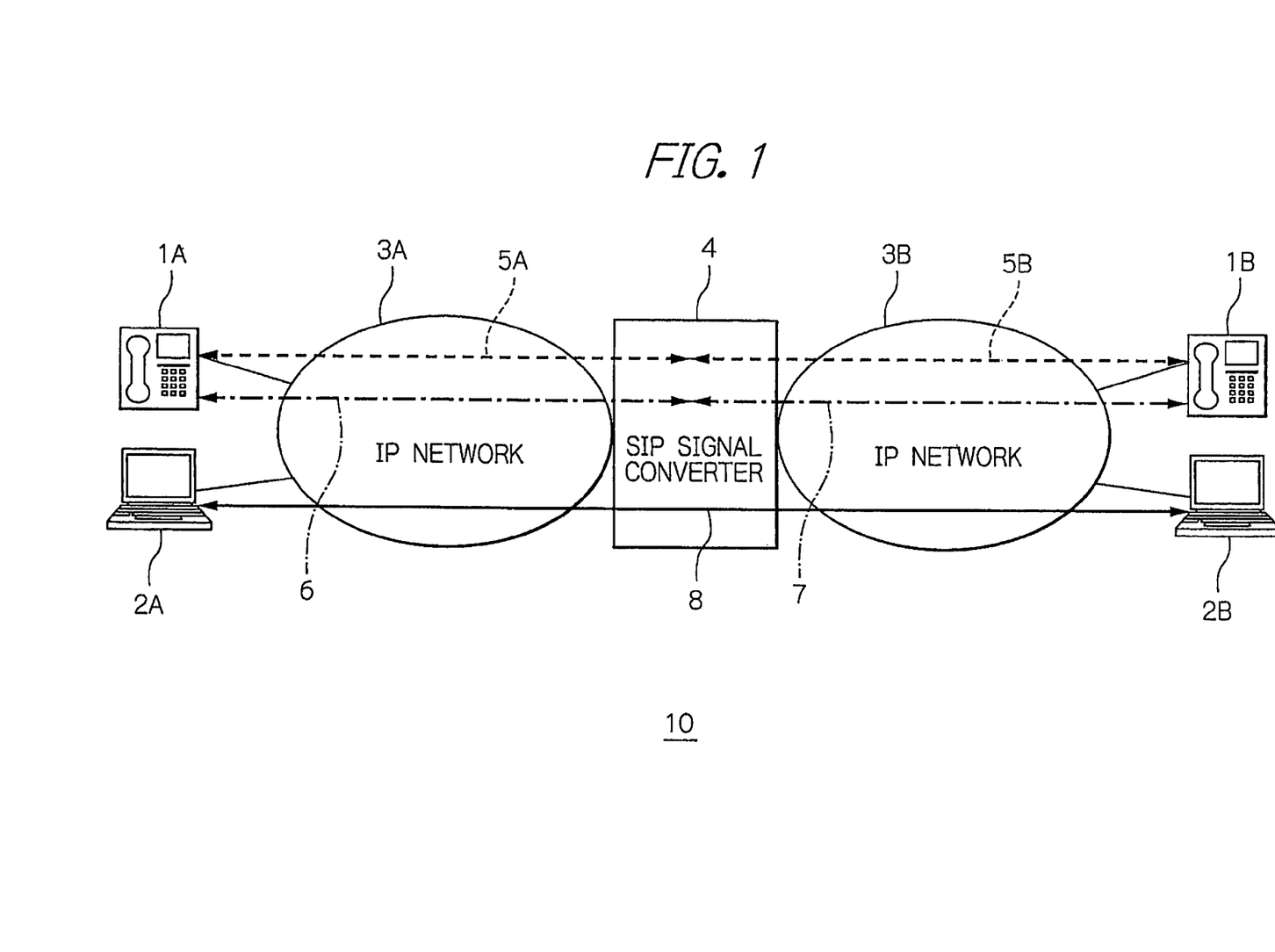
FIG. 1 schematically shows the overall constitution of an IP network of a preferred embodiment of the present invention.

A preferred embodiment of the apparatus for connection control according to the present invention will now be described with reference to the drawings. With reference first to FIG. 1, showing the overall system constitution of a telecommunications network 10, specifically IP (Internet Protocol) network in the preferred embodiment, the network 10 includes at least IP telephone terminals 1A and 1B, personal computers (PC) 2A and 2B, and a SIP (Session Initiation Protocol) signal converter 4 which are arranged as illustrated.

The SIP signal converter 4 is adapted to control interconnections to be established between communication terminals, such as 1A and 2B, over IP networks 3A and 3B. Specifically, the SIP signal converter 4 provides for media negotiation between different terminals when using media different in media format from each other.

As seen from FIG. 1, the SIP signal converter 4 is situated on a boundary between the IP networks 3A and 3B. Specifically, the SIP signal converter 4 includes a SIP signal conversion control function that provides for bidirectional SIP signal conversion between control signal packets 5A and 5B proposing media formats A and B, respectively.

The SIP signal converter 4 also has a media converting function of converting a plurality of medias having different media formats therebetween. The SIP signal converter 4 is thus able to accomplish media communications between two terminals even in case media formats available at the respective terminals differ from each other.

FIG. 1 specifically shows a case where the SIP signal converter 4 is connected to the IP telephone terminal 1A and the personal computer 2A over the IP network 3A, and also to the IP telephone terminal 1B and the computer 2B over the IP network 3B. However, other IP networks may be connected to the SIP signal converter 4 in addition to the networks 3A and 3B.

It should be noted that the IP networks 3A and 3B may be provided by the same or different common carriers, or communication business entities, which provide network services such as IP telephony or Internet connections. In the illustrative embodiment, the IP networks 3A and 3B use TCP/IP (Transmission Control Protocol/Internet Protocol) as the communication protocols thereof. However, the communication protocols may not be limited to the TCP/IP. The IP networks 3A and 3B may be structured by wired and/or wireless connections.

The IP telephone terminals 1A and 1B work on IP telephony function. The IP telephone terminals 1A and 1B may, for example, be an IP telephone set, a personal computer in which software implementing IP telephony is installed, that is, a so-called soft phone, or a mobile terminal having IP telephone function, such as a mobile phone, a PDA (Personal Digital Assistant) or a portable game player terminal.

In order to interconnect the channels of the IP telephone terminals 1A and 1B to each other during media communications, such as speech transmission, both terminals transmit control signal packets 5A and 5B to the SIP signal converter 4, respectively.

A data signal packet 6, e.g. for media format A, conceptually depicted with a dot-and-dash line, is of a media format that may be used by the IP telephone terminal 1A. Specifically, the data signal packet 6 for media format A may comply with the packet type prescribed from one coding form to another in accordance with, for example, the RFC3551 standard. With the present embodiment, the data signal packet 6 for media format A has a coding form A, by way of an example.

A data signal packet 7, e.g. for media format B, depicted with a dotted line, is of a media format that may be used by the IP telephone terminal 1B. Specifically, the data signal packet 7 for media format B is similar to the data signal packet 6 for media format A so as to have, in the illustrative embodiment, a coding from B, by way of an example.

The personal computers 2A and 2B are information processing terminals having the communication function of web browsing or data transferring over IP networks, such as the Internet. FIG. 1 shows the computers 2A and 2B as different in constitution from the IP telephone terminals 1A and 1B for simplifying the description. However, the computers 2A and 2B may also have the IP telephone function.

A data signal packet 8, other than of media, is depicted with a solid line in the figure, may be a file transfer packet, for example. Namely, it is a packet for a data signal, i.e. other than media exemplified by speech or video.

Figure 2:
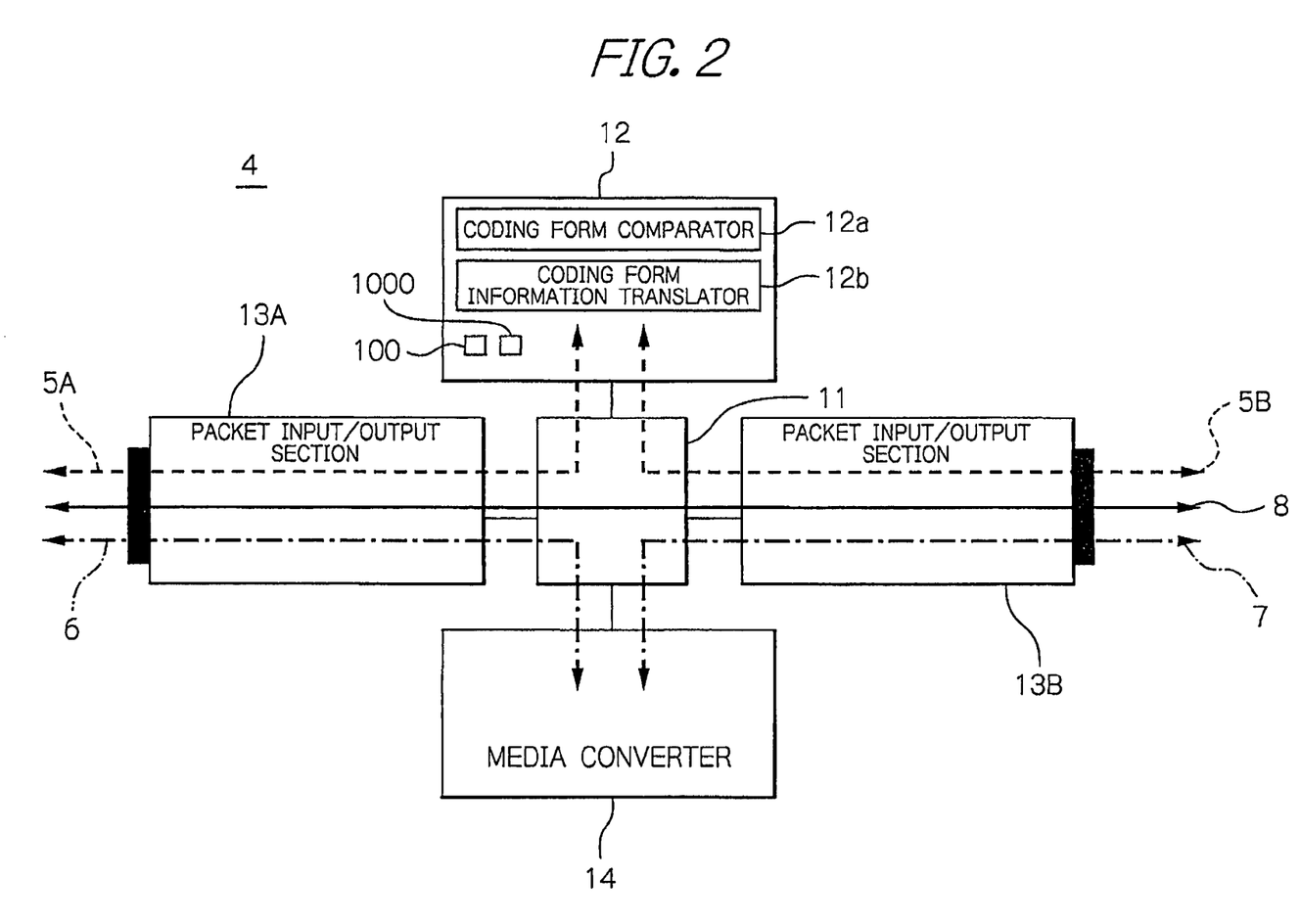
FIG. 2 is a schematic block diagram showing the functional constitution of a SIP signal converter in the illustrative embodiment shown in FIG. 1.

FIG. 2 is a schematic block diagram illustrating the functions of the SIP signal converter 4. In the figure, the SIP signal converter 4 basically includes at least a packet switching section 11, a controller 12, packet input/output sections 13A and 13B, and a media converter 14, which are interconnected as shown.

The packet switching section 11 is adapted to transfer packets it has received between those functional sections.

The packet input/output sections 13A and 13B have the packet transmitting/receiving function. The packet input/output sections 13A and 13B are adapted for discriminating a packet received to identify to which of the packet input/output section 13A or 13B, controller 12, or media converter 14 the packet is to be transmitted, and forward the packet to appropriate one thus identified.

Specifically as shown in FIG. 2, upon reception of the control signal packet 5A or 5B, the packet input/output section 13A or 13B, respectively, forwards the so received packet 5A or 5B via the packet switching section 11 to the controller 12. On reception of the data signal packet 6 or 7 for media format A or B, respectively, the packet input/output section 13A or 13B forwards the received packet 6 or 7 via the packet switching section 11 to the media converter 14. On receipt of the data signal packet 8 other than of media, the packet input/output section 13A or 13B transfers the received packet 8 through the packet switching section 11 toward the packet input/output section 13B or 13A, respectively.

The media converter 14 serves as converting the media format of the data signal packets 6 and 7.

The controller 12 controls the overall function of the SIP signal converter 4. The controller 12 is thus adapted to be responsive to a SIP packet functioning as a control signal to control an interconnection to be established between two terminals.

Specifically, the controller 12 analyzes the control signal packet 5A or 5B, received via the packet switching section 11, to verify the media format of both of the terminals which will take part in a communication to be established. In case the media formats available for both terminals differ from each other, then the controller 12 controls SIP signal conversion for converting SDP (Session Description Protocols) information defining a media format in the control signal. This accomplishes media negotiation between the two terminals to communicate with.

The SDP information conversion by the controller 12 is applied to media formats complying with, or supportable by, the media converter 14. For attaining that function, the controller 12 includes at least a coding form comparator 12*a* and a coding form information translator 12*b*, as depicted as its functional units. In addition, the controller 12 includes a coding form information table 100 and a media converter-supportable coding form list 1000.

Figure 3:
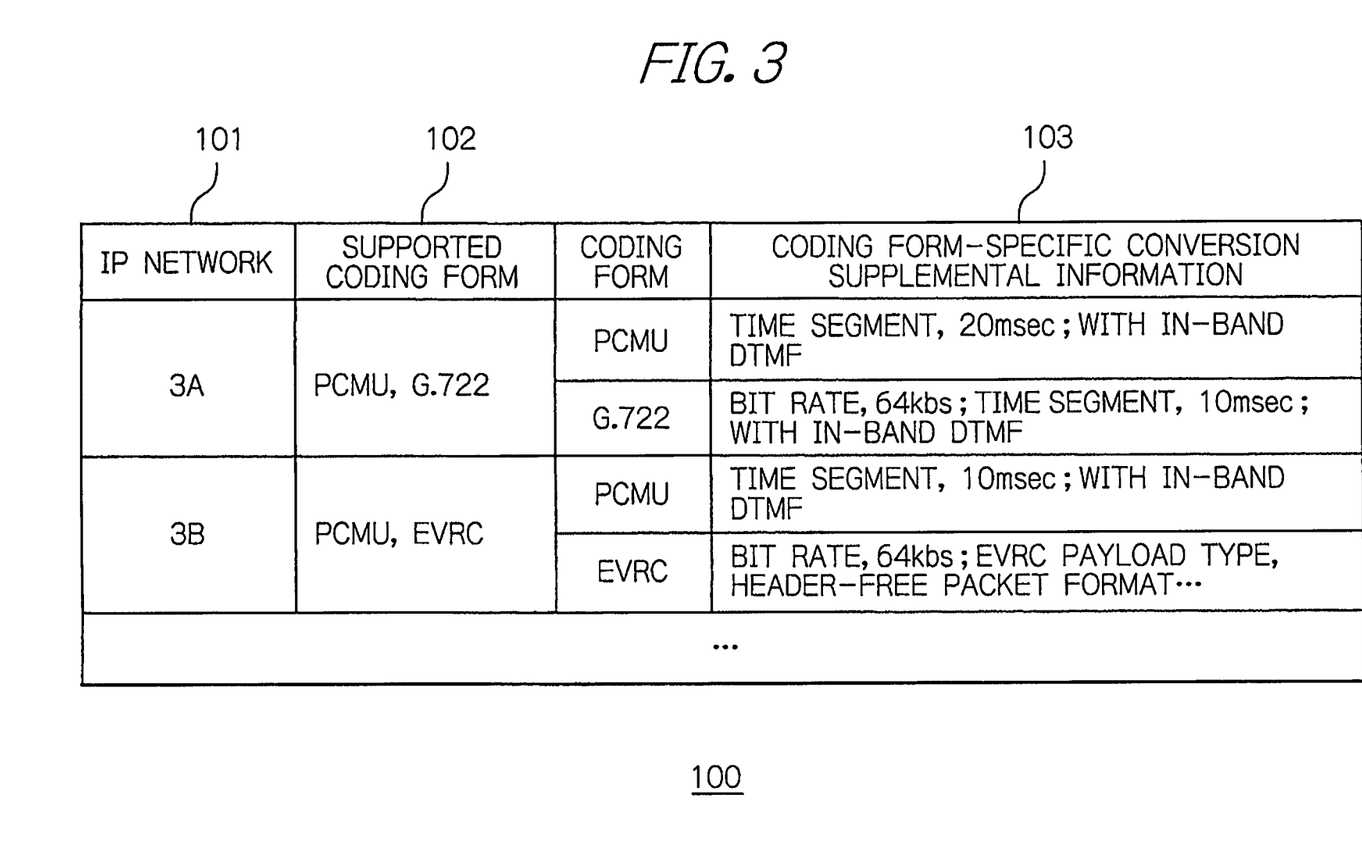
FIG. 3 illustrates an example of coding form information in the illustrative embodiment.

FIG. 3 shows the coding form information table 100 used for controlling the SIP signal conversion by the controller 12.

As shown, the coding form information table 100 has an IP network item 101, a supported coding form item 102, and a coding form-specific conversion supplemental information item 103.

Figure 4:
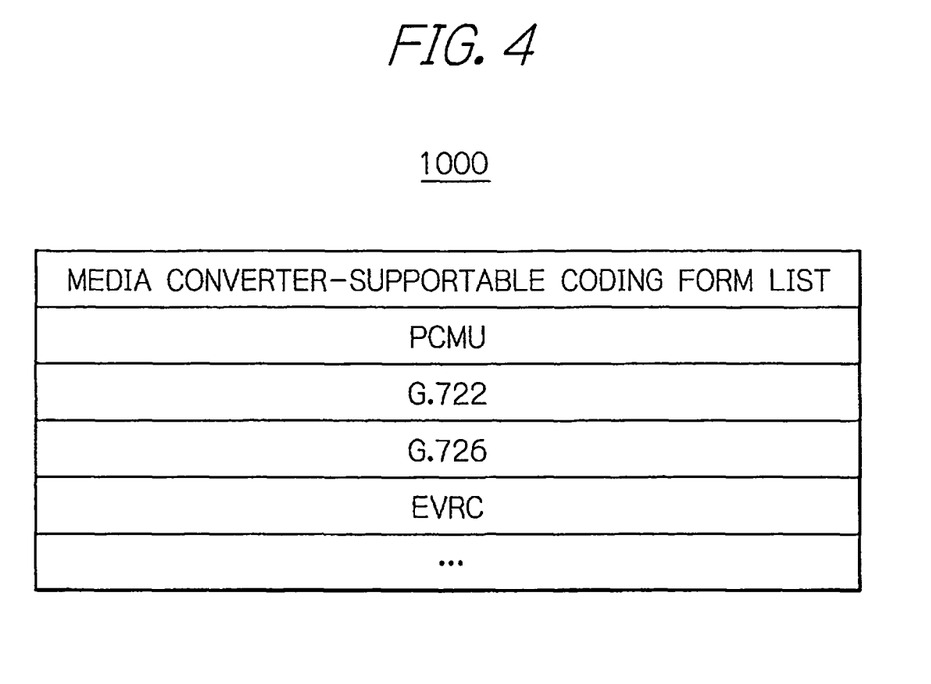
FIG. 4 illustrates an exemplified list of coding forms supported by a media converter in the illustrative embodiment.

It should be noted that coding forms stored in the coding form information table 100 may preferably be ones contained in the media converter-supportable coding form list 1000. That is, the coding forms on the coding form information table 100 may preferably be ones the media converter 14 may deal with.

The IP network item 101 defines an identifier for identifying a common carrier, i.e. communications business concern, or a network domain, such as the IP network 3A or 3B. The information having the same identifier is regarded as belonging to the same network.

The supported coding form item 102 denotes a coding form used by a media packet supported by a terminal belonging to a network in question.

The coding form-specific conversion supplemental information item 103 denotes supplemental information that is specific to a coding form and supplements to SDP conversion in media negotiation. With the aid of the coding form-specific conversion supplemental information, it is possible to convert or translate the media format information at hand defined in the SDP into the media format information optimum to the specific terminals to communicate with.

Encoding form information may be stored beforehand in the table 100 by a network manager in dependence upon the prevailing circumstance when constructing that IP network.

FIG. 4 exemplarily shows the media converter-supportable coding form list 1000. According to the example thus shown, the media converter 14 may specifically support PCMU specified in CCITT/ITU-T (Comite Consultatif International Telegraphique et Telephonique/International Telecommunication Union Telecommunication Standardization Sector) Recommendation G.711., as well as Recommendations G.722 and G.726, and EVRC (Enhanced Variable Rate Codec) for use in cdmaOne.

Figure 5A:
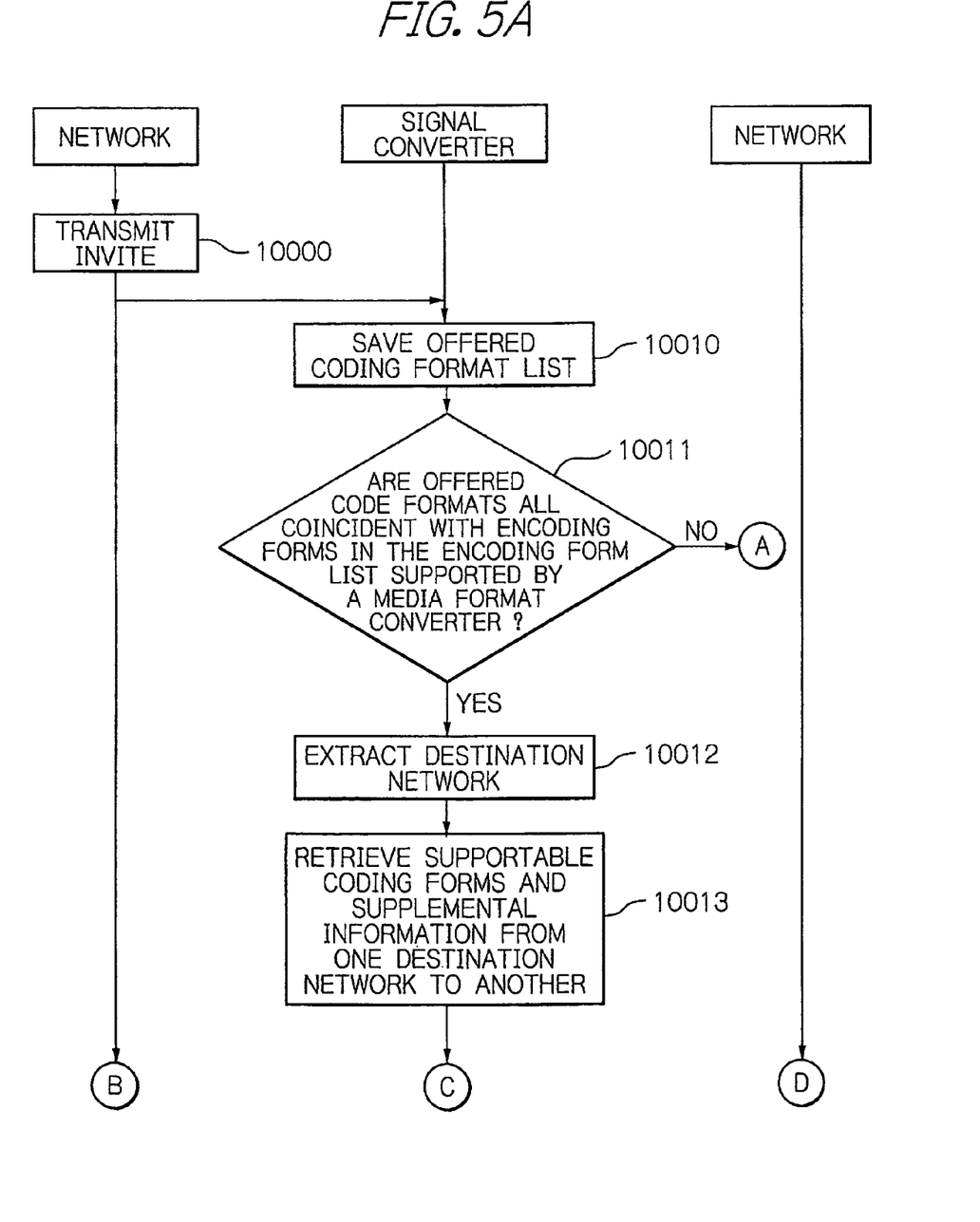
FIGS. 5A and 5B are a flowchart illustrating the operational sequence of SIP signal conversion of the illustrative embodiment.
Figure 5B:
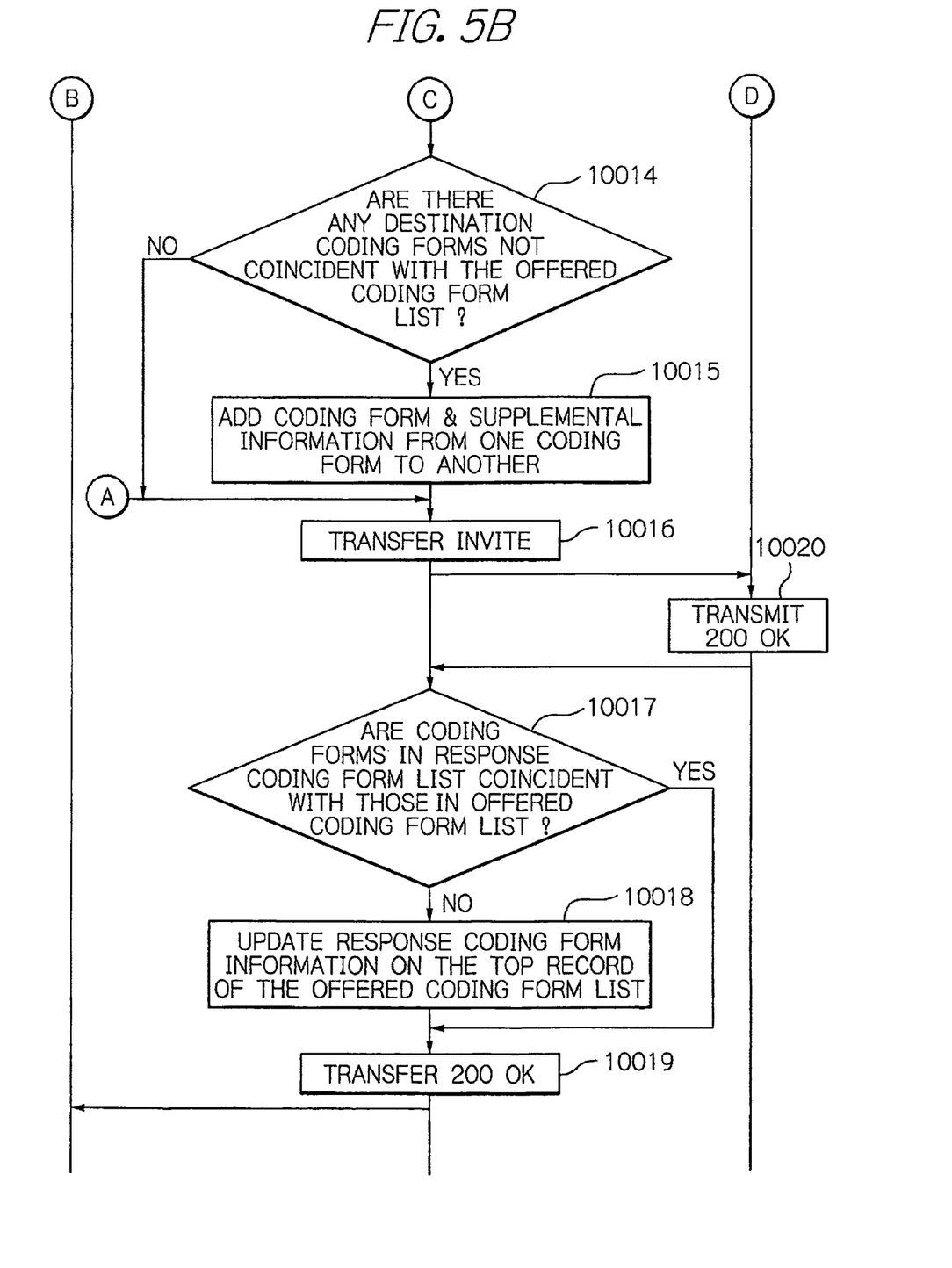

The operation of the SIP signal conversion of the illustrative embodiment will now be described with reference to further figures. FIGS. 5A and 5B are a flowchart useful for understanding the processing for SIP signal conversion proceeded to by the SIP signal converter 4 of the illustrative embodiment. FIGS. 5A and 5B are directed to a specific case for controlling a connection to be established between a terminal on the IP network 3A and a terminal on the IP network 3B.

Initially, a calling, or source, terminal, not shown, on the IP network 3A transmits, in order to raise a request for establishing a connection to another terminal on the IP network 3B, a packet INVITE, which is the control signal packet 5A (step 10000).

The packet INVITE has its body conveying information described in SDP. An offered coding form list 90, FIG. 6, containing information on a media format usable on the terminal connected to the IP network 3A is included in the SDP information of the packet INVITE.

Figure 6:
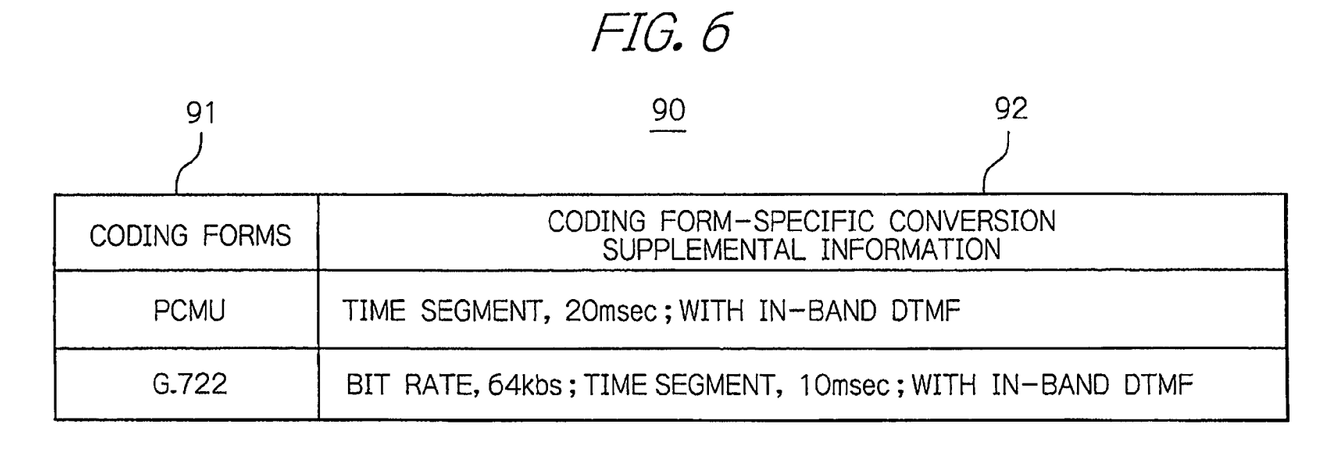
FIG. 6 illustrates an exemplified list of offered coding forms in the illustrative embodiment.

FIG. 6 illustrates the offered coding form list 90. Referring to the figure, the offered coding form list 90 includes at least a coding form item 91 and a coding form-specific conversion supplemental information item 92.

The coding form item 91 includes coding forms usable on a source IP network, to which a calling terminal belongs. One or more coding forms may be so stored, which may be used at a terminal of the source IP network. In the example shown in FIG. 6, coding forms PCMU and G.722 are available on the source IP network.

The coding form-specific conversion supplemental information item 92 defines supplemental information for each coding form. In FIG. 9, the coding form PCMU, for example, defines a dividing time of 20 ms and involves an in-band DTMF (Dual-Tone Multi-Frequency) in the column of detailed setting information on the source IP network.

With reference to FIG. 5A again, when supplied with a packet INVITE from the source IP network 3A, the SIP signal converter 4 saves the offered coding form list 90, which is the SDP information of the packet INVITE (step 10010).

The SIP signal converter 4 compares the offered coding form list 90 to the media converter-supportable coding form list 1000 to verify whether or not all of the coding forms present in the offered coding form list 90 is present in the media converter-supportable coding form list 1000 (step 10011).

When at least one, or all, of the coding forms in the offered coding form list 90 are inconsistent with any of the media converter-supportable coding forms, the processing transfers to a step 10016 to transfer the packet INVITE to the IP network 3B.

If all the coding forms in the offered coding form list 90 are present in the media converter-supportable coding forms, then the SIP signal converter 4 extracts from the packet INVITE information on a destination IP network, to which a called terminal belongs (step 10012). Using this destination IP network information, the SIP signal converter 4 retrieves the coding form item 102, supported by the destination IP network 3B, and the coding form-specific conversion supplemental information item 103, from the coding form information table 100.

At this time, it is possible to verify whether or not the coding forms, supported by the destination IP network 3B, are included in the media converter-supportable coding form list 1000.

Referring to FIG. 5B, the SIP signal converter 4 compares the coding form item 102, supported by the destination IP network 3B, and the offered coding form list 90, to each other, to verify if there is one or more of the coding forms in the coding form item 102, supported by the destination IP network 3B, which are missing from the offered coding form list 90 (step 10014).

If all of the coding forms of the coding form item 102, supported by the destination IP network 3B, are included in the offered coding form list 90, then the media formats that may be used in the IP networks 3A and 3B are the same. Thus, the processing transfers to a step 10016 to transfer the packet INVITE, without translating the SDP information.

If one or more of the coding form items 102, supported by the destination IP network 3B, are missing from the offered coding form list 90, then the coding form or forms in the item 102 supported by the destination IP network 3B and missing from the offered coding form list 90 and the corresponding coding form-specific conversion supplemental information are added to the offered coding form list 90, thus updating the SDP information of the packet INVITE (step 10015).

The conversion supplemental information, lacking from the offered coding form list 90, is taken from the coding form-specific conversion supplemental information item 103 of the coding form information table 100.

In a step 10016, the packet INVITE is transferred towards the destination IP network 3B.

The processing of the steps 10011 to 10015 will now be described in detail with reference to further figures. For example, the offered coding form list 90, shown in FIG. 6, is stored in the SIP signal converter 4. Specifically, the coding forms usable on the source IP network 3A are PGMU and G.722.

Comparison of the offered coding form list 90 to the media converter-supportable coding form list 1000 indicates that both PGMU and G.722 are included in the media converter-supportable coding form list 1000. It may thus be confirmed that these are coding forms that may be converted by the media converter 14.

The identification information for the "IP network 3B" is then extracted from the packet INVITE as the destination IP network information. The coding forms in the item 102 supported by the IP network 3B and the corresponding coding form-specific conversion supplemental information in the item 103 are then retrieved from the coding form information table 100. In short, it is recognized that the coding forms supported by the destination IP network 3B are PCMU and EVRC.

Comparison of the coding forms "PCMU and EVRC" supported by the destination IP network 3B to the coding forms "PCMU, G.722" of the offered coding form list 90 indicates that EVRC is missing from the offered coding form list 90.

Hence, the EVRC and the conversion supplemental information item 103 for the EVRC are added to the offered coding form list 90, thereby translating the SDP information for the packet INVITE. This packet INVITE, thus processed for SIP signal conversion, is then transmitted to the IP network 3B.

In the next step 10020, FIG. 5B, the terminal connected to the IP network 3B transmits a packet 200 OK, which is a response control signal for the packet INVITE.

The packet 200 OK has its body including information defined by the SDP. Specifically, the SDP information of the packet 200 OK carries the offered coding form list 90, which includes media format or formats available on the terminal belonging to the IP network 3B.

Figure 7:
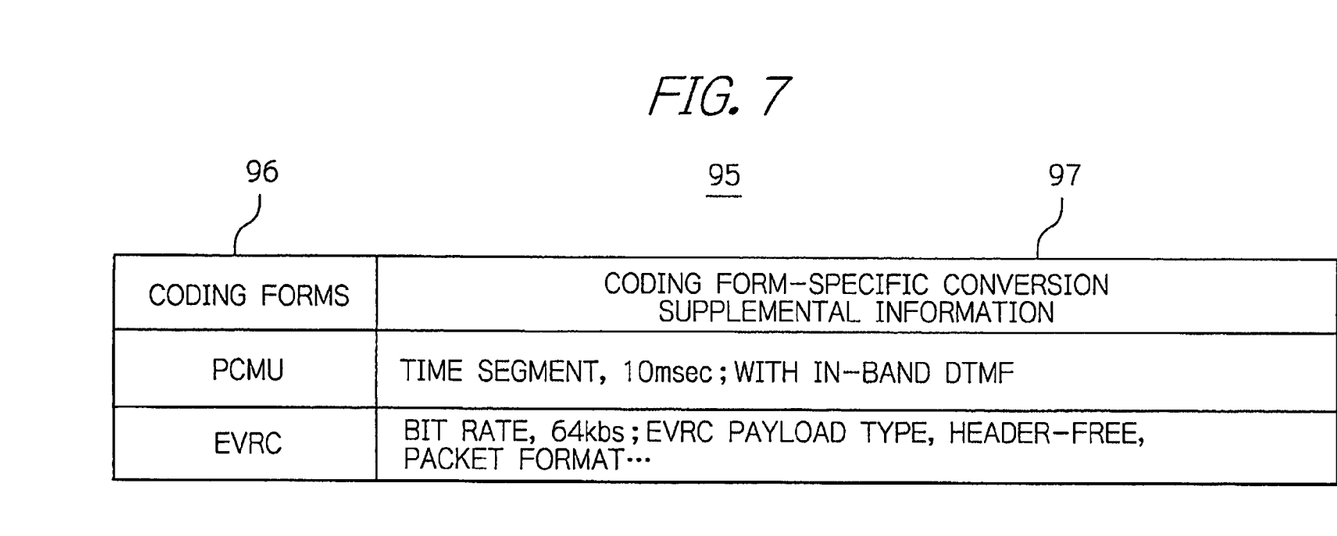
FIG. 7 illustrates an exemplified list of response coding forms in the illustrative embodiment.

FIG. 7 illustrates a response coding form list 95. The response coding form list 95 includes at least coding form item 96 and the coding form-specific conversion supplemental information item 97. The coding form item 96 and the coding form-specific conversion supplemental information item 97 include the coding forms usable on a terminal belonging to the destination IP network 3B and the corresponding supplemental information, respectively.

The SIP signal converter 4 extracts the response coding form list 95 included in the packet 200 OK received, and compares the response coding form list 95 to the offered coding form list 90 stored therein. The SIP signal converter 4 verifies whether or not the coding forms 96 of the response coding form list 95 coincide with the coding forms 91 of the offered coding form list 90 (step 10017).

It is unnecessary for all of the coding forms 96 of the response coding form list 95 to be coincident with the coding forms 91 of the offered coding form list 90, it being sufficient that one or more of the coding forms 96 are so coincident. That is, if one of the coding forms 96 is so coincident, it means that there is a media format common to the two coding forms and hence it is possible to carry out the media communication.

In case at least one of the coding forms 96 of the response coding form list 95 is coincident with the coding form or forms 91 of the offered coding form list 90, the processing transfers to a step 10019 to transfer the packet 200 OK to the IP network 3A without updating the information of the response coding form list 95.

In case none of the coding forms 96 of the response coding form list 95 is coincident with the coding forms 91 of the offered coding form list 90, then the contents of the response coding form list 95 are updated.

The contents of the response coding form list 95 are updated by selecting one, which is highest in priority, of the coding forms included in the offered coding form list 90 to add the selected one to the response coding form list 95. In FIG. 6, for example, the coding form on the top record will be selected. For this aim, the offered coding form list 90 may additionally have an item "selection priority", not shown in FIG. 6, to thereby provide for priority setting as determined on the side of the IP network 3A.

In the step 10019, FIG. 5B, the packet 200 OK is transmitted to the IP network 3A.

By providing the SIP signal converter 4 thus operative in the manner shown in FIGS. 5A and 5B, media negotiation between two terminals may be accomplished even in case a media format usable on a terminal belonging to the IP network 3A differs from one usable on a terminal belonging to the IP network 3B.

By affording or adding the supplemental information regarding the media conversion, at the time of media negotiation, it is possible to provide the optimum media conversion.

With the illustrative embodiment, described above, media negotiation for establishing interconnection between different terminals is made possible even if a media format usable on one of the terminals differs from that of the other terminal, on the condition that the differing media formats are among the media formats supported by the media converter.

In the above-described illustrative embodiment, the SIP signal converter 4 is adapted to translate media format information defined with the SDP. However, the present invention is not restricted to media format information defined with the SDP but is also applicable to media format information defined with a protocol other than the SDP.

In the illustrative embodiment, the media converter and the controller, i.e. a control signal conversion controller, are physically combined to form one and the same unit. However, the media converter and the controller may be arranged as respectively distinct computers.

In the illustrative embodiment, the SIP signal converter 4 is adapted to exercise peer-to-peer connection control between two or more terminals. However, the SIP signal converter in accordance with the present invention may be applied to systems other than the peer-to-peer system, such as a teleconferencing system or a multi-cast system.

In such a case, the SIP signal converter 4 may be adapted to hold coding form information that may be used by all of the user terminals beforehand, and to be responsive to media format information (SDP information) contained in a packet INVITE from a source terminal to respectively compare coding forms usable on the source terminal to those usable on the destination terminals, thus proceeding to the processing described on the illustrative embodiment.

Alternatively, the SIP signal converter 4 may be adapted to use destination network information in a packet INVITE transmitted from a source side and the coding form information table 100 to find out the coding forms of multiple destination terminals, and in turn verify whether or not there is a coding form common to the multiple destination terminals. If there is such a common coding form, the common form is used as a coding form usable on the multiple destination terminals. The processing that will follow may be the same as already described in connection with the illustrative embodiment.

The SIP signal converter of the present invention includes the means for supplementing coding form information in media negotiation. The supplementation means may be used to add coding forms, supported by a destination IP network, to offered coding forms, and the resulting offered coding forms are transmitted. This provides for media negotiation, aimed to establish an interconnection between two or more terminals, even though the media formats supported by the different terminals differ from one another.

In addition, the SIP signal converter of the present invention includes the means for supplementing coding form information in media negotiation, whereby the SIP signal converter is able to hold coding form-specific conversion supplemental information from one IP network to another and from one coding form to another. In addition, if it should become necessary to add an offered encoding form in an offered coding form list, the SIP signal converter is able to supplement conversion supplemental information that may not be inferred from the offered coding form list entered. Thus, optimum media conversion may be accomplished between the terminals by adopting coding form conversion supplemental information supported by a destination IP network.

The entire disclosure of Japanese patent application No. 2008-293588 filed on Nov. 17, 2008, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A connection control apparatus configured for interconnecting a plurality of terminals, comprising:
   a communication circuit for transmitting or receiving a connection control signal to or from the terminals;
   a media format information storage for storing media format information identifying media formats that are usable on the terminals which are to be supplied with media information in media formats converted by a media format converter, and for storing format-specific information specifying parameters that are specific to the stored media format information; and
   a media format information supplementing circuit operative in response to the connection control signal received from the terminals for referencing said media format information storage to verify a presence of common media format information that may be used by the terminals which are being interconnected,
   wherein said media format information supplementing circuit supplements the connection control signal, if there is no common media format information, with predetermined media format information, and delivers a resulting connection control signal to said communication circuit,
   wherein said media format information supplementing circuit supplements the connection control signal not only with the information indicating the media format but also with the media format-specific information, and
   wherein said media format information supplementing circuit includes
      a media format information comparator for comparing offered media format information of a connection requesting terminal contained in a connection request signal received from the connection requesting terminal to the media format information of a destination terminal stored in said media format information storage; and
      a media format information converter, operative in response to said media format information comparator having verified that an item of the media format information of the destination terminal is missing from the offered media format information, for supplementing the connection request signal with the media format information corresponding to the missing item in the offered media format information and with format-specific information that is stored in the media format information storage and that corresponds to the missing item in the offered media format information.

2. The apparatus in accordance with claim 1, wherein
   said media format information comparator compares media format response information of the destination terminal, contained in a response control signal from the destination terminal, to the offered media format information from the connection requesting terminal, and
   said media format information converter being operative, in response to said media format information comparator having verified the media format response information to be inconsistent with the offered media format information, to add media format information of higher priority contained in the offered media format information to the media response information.

3. A method for connection control of a connection control apparatus configured for interconnecting a plurality of terminals, comprising the steps of:
   storing media format information usable on the terminals which are to be supplied with media information in media formats converted by a media format converter, and also storing format-specific information specifying parameters that are specific to the media format information, the media format information and the format-specific information being stored in a media format information storage;
   transmitting or receiving a connection control signal to or from the terminals by a communication circuit;
   using the connection control signal, received from one of a pair of the terminals that are to be connected, to reference the media format information storage by a media format information supplementing circuit; and
   supplementing the connection control signal, if said one of the pair of the terminals that are to be connected can use a particular one of the media formats but the other terminal of the pair cannot, with media format information identifying the particular one of the media formats and format-specific information specific to that media format information, and delivering a resulting connection control signal to the communication circuit.

4. A non-transitory computer-readable medium storing connection control program for controlling a computer, wherein the computer includes a storage for storing media format information identifying media formats that are usable on a plurality of terminals which are to be supplied with media information in media formats converted by a media format converter, said program controlling the computer to operate as:
   a communication circuit for transmitting or receiving a connection control signal to or from the terminals; and
   a media format information supplementing circuit operative in response to the connection control signal received from the terminals for referencing said storage to verify a presence of common media format information that may be used by the terminals which are being interconnected, wherein said media format information supplementing circuit supplements the connection control signal, if there is no common media format information, with predetermined media format information, and delivers a resulting connection control signal to said communication circuit, and wherein said media format information supplementing circuit supplements the connection control signal not only with the information indicating one of the media formats but also with the media format-specific information corresponding to said one of the media formats, the format-specific information specifying parameters that are specific to the said one of the media formats.

* * * * *